(12) United States Patent
Berger et al.

(10) Patent No.: US 11,999,213 B2
(45) Date of Patent: Jun. 4, 2024

(54) CHASSIS COMPONENT AND METHOD FOR PRODUCING A CHASSIS COMPONENT OF THIS TYPE

(71) Applicant: ZF Friedrichshafen AG, Friedrichshafen (DE)

(72) Inventors: Artur Berger, Bohmte (DE); Sebastian Meindl, Osthofen (DE); Tim Holthaus, Sendenhorst (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/998,865

(22) PCT Filed: Apr. 21, 2021

(86) PCT No.: PCT/EP2021/060291
§ 371 (c)(1),
(2) Date: Nov. 15, 2022

(87) PCT Pub. No.: WO2021/239336
PCT Pub. Date: Dec. 2, 2021

(65) Prior Publication Data
US 2023/0173867 A1 Jun. 8, 2023

(30) Foreign Application Priority Data
May 25, 2020 (DE) .................... 10 2020 206 438.5

(51) Int. Cl.
*B60G 17/019* (2006.01)
*B60G 7/00* (2006.01)

(52) U.S. Cl.
CPC .......... *B60G 17/019* (2013.01); *B60G 7/001* (2013.01); *B60G 2204/1162* (2013.01); *B60G 2204/418* (2013.01)

(58) Field of Classification Search
CPC .................. B60G 17/019; B60G 7/001; B60G 2204/1162; B60G 2204/418;
(Continued)

(56) References Cited

U.S. PATENT DOCUMENTS 7,357,036 B2 4/2008 Steprath
10,252,595 B2 4/2019 Haskamp et al.
(Continued)

FOREIGN PATENT DOCUMENTS

DE 10 2018 216 061 A1 3/2020
DE 10 2019 201 521 A1 8/2020
EP 2 000 335 A2 12/2008

OTHER PUBLICATIONS

Eureopean Patent Office, International Search Report issued in International application No. PCT/EP2021/060291 (dated Jul. 15, 2021).
(Continued)

*Primary Examiner* — Paul N Dickson
*Assistant Examiner* — Shams Dhanani
(74) *Attorney, Agent, or Firm* — Finch & Maloney PLLC

(57) ABSTRACT

A chassis component (1, 32) has a first end section (2), a second end section (3), and a connecting section (4) between the two end sections (2, 3), with at least one bearing (9, 10) in one of the two end sections (2, 3). A sensor device (13) has a sensor housing (14, 33) with a first sensor element (16). To improve and/or enable the arrangement of the sensor device (13) and/or the sensor housing (14) on the chassis component (1, 32), the two end sections (2, 3) and the connecting section (4) of the chassis are made as a one-piece profile (5) open on one side along its length, such that the open profile (5) forms an at least partially free inside space (17), and where the first sensor element (16) is located within the inside space (17).

15 Claims, 7 Drawing Sheets

(58) Field of Classification Search
CPC .......... B60G 2204/116; B60G 2204/41; B60G 2206/012; B60G 2206/11; B60G 2400/05162; B60G 2401/172; B60Y 2400/86
See application file for complete search history.

(56) References Cited

U.S. PATENT DOCUMENTS

| | | | | |
|---|---|---|---|---|
| 2020/0114717 | A1* | 4/2020 | Stratmann | B60G 7/005 |
| 2021/0262517 | A1* | 8/2021 | Bronswick | F16C 11/0695 |
| 2021/0309061 | A1* | 10/2021 | Sieve | F16C 11/0614 |
| 2023/0241941 | A1* | 8/2023 | Berger | B60G 17/019 |
| | | | | 324/207.11 |

OTHER PUBLICATIONS

European Patent Office, Written Opinion issued in International application No. PCT/EP2021/060291 (dated Jul. 15, 2021).
German Patent Office, Office Action issued in German patent application No. 10 2020 206 438.5 (dated Jun. 29, 2023).

\* cited by examiner

CHASSIS COMPONENT AND METHOD FOR PRODUCING A CHASSIS COMPONENT OF THIS TYPE

RELATED APPLICATIONS

This application claims the benefit under 35 U.S.C. § 371 as a U.S. National Phase Application of application no. PCT/EP2021/060291, filed on 21 Apr. 2021, which claims benefit of German Patent Application no. 10 2020 206 438.5 filed 25 May 2020, the contents of which are hereby incorporated herein by reference in their entireties.

FIELD OF THE DISCLOSURE

The invention relates to a chassis component having a first end section and a second end section, wherein a connecting section is arranged between the two end sections, with at least one bearing in one of the two end sections and with a sensor device, such that a sensor housing comprises a first sensor element of the sensor device. In addition, the invention relates to a method for producing a chassis component of the said type.

BACKGROUND

A chassis component of the type concerned is known from DE 10 2019 201 521 A1. According to this the sensor device comprises a pin-like sensor strut which is inserted into a blind-hole-like aperture of the chassis component.

SUMMARY

However, not every chassis component provides the possibility of forming a blind-hole-like aperture. In particular, with chassis components made of sheet metal that possibility as a rule does not exist. Accordingly, there is a need to develop or provide another way of attaching a sensor device and/or a sensor housing to a chassis component, in particular to a coupling rod.

The purpose of the present invention is to develop further a chassis component and/or a method of the type mentioned at the outset, in such manner that an arrangement of the sensor device and/or the sensor housing on a chassis component is improved and/or made possible. In particular an alternative embodiment should be provided.

The objective on which the invention is based is achieved with a chassis component according to the present disclosure. Preferred further developments of the invention are defined in the claims and in the description that follows.

According to these, the invention relates to a chassis component. In particular, the chassis component is arranged in a chassis of a vehicle, preferably a motor vehicle. A chassis component can, in general terms, be a chassis support, a transverse support, an axle support, a flange joint, a wheel carrier, or a chassis suspension arm. The chassis component has a first end section and a second end section. In particular, the two end sections are formed at two ends of the chassis component remote from one another. The chassis component can be of strut-like shape and/or essentially straight. A connecting section is arranged between the two ends. The connecting section can be essentially of strand-like form. Furthermore, the chassis component comprises a sensor device. A sensor housing has a first sensor element of the sensor device. In particular the sensor device is in the form of an angle measuring device. Preferably, by means of the sensor device a relative rotation of the chassis component about a rotation axis of the bearing can be detected and/or measured. The two end sections and the connecting section are formed as a one-piece profile open on one side along its length, such that the open profile at least partially forms a free inside space. In this case the first sensor element is located within the said inside space.

Here, it is advantageous that at least the first sensor element is sufficiently well protected against outside influences owing to its arrangement within the inside space of the open profile. In particular, in that way the first sensor element can be or is positioned as close as possible to the bearing and/or to a second sensor element located in the bearing.

Preferably the chassis component has a U-shaped or C-shaped cross-section, particularly in the area of the connecting section. In particular, the open profile has a U-shaped or C-shaped cross-section. Furthermore, the chassis component can be in the form of a 2-point control arm. Preferably, the chassis component is in the form of a sheet-metal control arm, in particular a sheet-metal transverse control arm. In that way the end sections and the connecting section can be formed in one piece from a deformed sheet. As the material for the sheet, steel or aluminum can be used. In the first end section and/or in the second end section a bearing holder can be formed for positioning or pressing in the bearing.

According to a further development, the sensor housing is fixed onto a wall of the open profile, in particular by a separate and/or stand-alone fixing means. The fixing means can be in the form of a rivet or a screw. The sensor housing can have a perforation and/or a bore for the partial insertion of the fixing means. In particular the open profile, or the wall of the open profile, has a fixing opening for plugging in, pressing in or screwing in the fixing means. In particular, by virtue of its fixing by means of the fixing means the sensor housing is held in a fixed position relative to the open profile on the chassis component. For that purpose, the fixing means can co-operate in an interlocked and/or frictional manner with the fixing opening and/or the wall of the open profile.

In a further embodiment the sensor housing is arranged at least partially or completely within the said inside space. In particular, a section of the sensor housing with the first sensor element is arranged within the inside space. The sensor housing can be in contact with an outside and/or an inside of a wall of the open profile. If the sensor housing is arranged completely within the inside space, the whole of the sensor housing is particularly well protected against outside influences by the open profile surrounding the sensor housing.

Preferably, the sensor housing is made of a plastic material. In particular, the sensor housing is made as an injection-molded component. In that case the first sensor element can be embedded in the material of the sensor housing. In that way the first sensor element is protected against outside influences.

According to a further development, one wall of the open profile has a through-going opening. In this case the sensor housing extends from an outside of the wall through the said opening into the inside space. In particular, a section of the sensor housing with the first sensor element is located within the inside space. Preferably, the section of the sensor housing with the first sensor element faces toward the bearing and/or toward a second sensor element. A further section of the sensor housing can be located outside the inside space, in particular on the outside of a wall of the open profile.

Preferably, a rim of the through-going opening comprises a first plug-in portion. The first plug-in portion co-operates in an interlocked manner with a second plug-in portion designed to correspond with the first plug-in portion. Thus, the sensor housing contains the second plug-in portion. The two plug-in portions form an interlocked connection between the sensor housing and the wall of the open profile with the through-going opening. The first plug-in portion can be in the form of a groove-like depression in the rim of the through-going opening. The rim of the through-going opening can be essentially right-angle shaped, wherein a section of the rim also has the groove-like depression. In particular, the groove-like depression is formed in a section of the rim of the through-going opening close to the adjacent bearing. A constriction of the sensor housing corresponding to the groove-like depression can constitute the second plug-in portion. This constriction of the sensor housing is plugged into the groove-like depression with interlock. Preferably, the constriction is formed by reducing the diameter of the sensor housing in some sections. To form the constriction, for example a web-like section of the sensor housing can have two grooves arranged on sides that face away from one another.

In a further development, the sensor housing has an at least one-stepped contour. Alternatively, the sensor housing can have a contour with two or even three steps. In particular a contour with one or more steps is visible in a side view of the sensor housing. Such a stepped contour enables the sensor housing to be introduced through the through-going opening in the wall of the open profile. At the same time a structure which is relatively flat on the whole can be produced, in which part of the sensor housing is on the outside of the wall and another part of the sensor housing is on the inside of the wall of the open profile. Moreover, such a contour makes it possible to arrange the first sensor element as close as possible to the bearing or to a second sensor element. Preferably, the first sensor element is arranged at a first end of the sensor housing. This first end of the sensor housing preferably faces toward the bearing or toward a second sensor element. A plug-in portion can be formed at a second end of the sensor housing. In particular, the plug-in portion and/or the second end of the sensor housing faces away from the first end of the sensor housing. Preferably, the plug-in portion enables a connection to be formed with an evaluation unit.

Preferably, the bearing comprises a second sensor element of the sensor device. In that case the first sensor element co-operates with the second sensor element. In particular, the first sensor element is a sensor sensitive to magnetic fields and the second sensor element is a magnet. Preferably, the first sensor element is in the form of a Hall sensor. When the bearing and therefore the second sensor element moves, the magnetic field changes relative to the first sensor element and this can be detected by the first sensor element. In that way an angle and/or an angle change can be determined. Thus, by means of the sensor device a relative rotation of the chassis component with respect to the bearing about at least one or exactly one rotation axis of the bearing can be determined.

According to a further development, the bearing is in the form of a rubber bearing. In particular the open profile and/or the chassis component is in the form of a sheet-metal control arm. The rubber bearing can have an outer sleeve. In particular the outer sleeve has an opening. In this case the first sensor element is arranged outside the outer sleeve and close to the said opening. The second sensor element of the sensor device is located inside the outer sleeve and close to the opening. Thus, the first sensor element and the second sensor element co-operate with one another through the opening in the outer sleeve. In particular the opening of the outer sleeve is in the form of a cut-out in the wall material of the outer sleeve.

Particularly advantageous is a method for producing a chassis component according to the invention, wherein the first sensor element is located within the inside space. In that way the first sensor element can be protected against outside influences and/or it can be positioned as close as possible to the bearing and/or the second sensor element.

Preferably, the sensor housing is plugged in through the through-going opening in the wall of the open profile, whereby a section of the sensor housing with the first sensor element is arranged within the inside space. A further section of the sensor housing can remain outside the inside space. In particular, thereafter a second plug-in portion of the sensor housing is inserted into a first plug-in portion in a rim of the through-going opening to form an interlock. In that way the sensor housing can be held and/or fixed at least relative to two spatial directions. Preferably, after that the sensor housing is fixed to a wall of the profile by means of a fixing means. In particular, in that way the sensor housing is secured relative to a third spatial direction. Preferably, the three spatial directions constitute a three-dimensional Cartesian co-ordinate system.

Overall, by virtue of the fixing means and/or the interlock between the two plug-in portions a positionally fixed arrangement of the sensor housing on the chassis component is obtained. Before or after the sensor housing has been positioned, the bearing is fitted into the bearing holder of the chassis component. In particular, the bearing contains the second sensor element, so that the bearing is arranged orientated in the bearing holder in such manner that the second sensor element is orientated with the smallest possible gap from the first sensor element.

In particular, the chassis component made by means of the method according to the invention is a chassis component according to the invention as described earlier. Preferably, the method is developed further in accordance with the designs explained in connection with the chassis component described herein. Moreover, the chassis component described herein can be developed further in accordance with the designs explained in connection with the method.

BRIEF DESCRIPTION OF THE DRAWINGS

Below, the invention is explained in greater detail with reference to the figures. In these, the same indexes denote the same, similar or functionally equivalent components or elements. The figures show.

DETAILED DESCRIPTION

Figure 1:
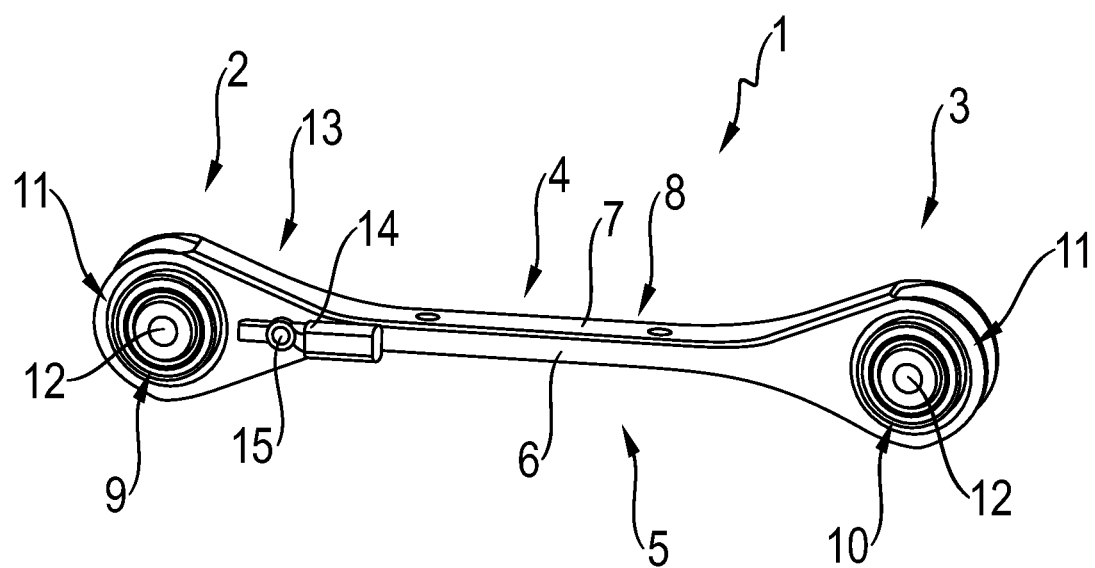
FIG. 1: A side view of a chassis component according to the invention.

FIG. 1 shows a side view of a chassis component 1 according to the invention. In this example embodiment the chassis component 1 comprises a first end section 2 and a second end section 3. Between the two end sections 2 and 3 is arranged a connecting section 4 which connects the end sections 2, 3 to one another. The two end sections 2, 3 and the connecting section 4 are made as a one-piece or integral profile 5. In this case the profile 5 is open on one side all along its length. In this example embodiment the profile 5 or at least its connecting section 4 has an essentially U-shaped cross-section. Thus, the profile 5 has three walls 6, 7, and 8 arranged in a U-shape relative to one another. In this, the walls 6 and 8 are essentially parallel to one another and extend essentially perpendicularly or transversely to the wall 7, away from it in the same direction.

In this example embodiment, the chassis component 1 comprises a bearing 9 and a bearing 10. The bearings 9 and 10 are in this case each in the form of rubber bearings. The bearing 9 is arranged in the first end section 2 and the bearing 10 in the second end section 3. For this, the first end section 2 and the second end section 3 in each case have a bearing holder 11 into which the bearings 9 and 10 are pressed in this example embodiment. By means of the bearings 9 and 10, in each case a rotation axis 12 is defined or predetermined, about which the chassis component 1 is mounted and able to rotate.

Furthermore, the chassis component 1 comprises a sensor device 13. The sensor device 13 comprises a sensor housing 14. The sensor housing 14 is fixed onto an outside of the wall 6 of the profile 5 by a fixing means 15.

Figure 2:
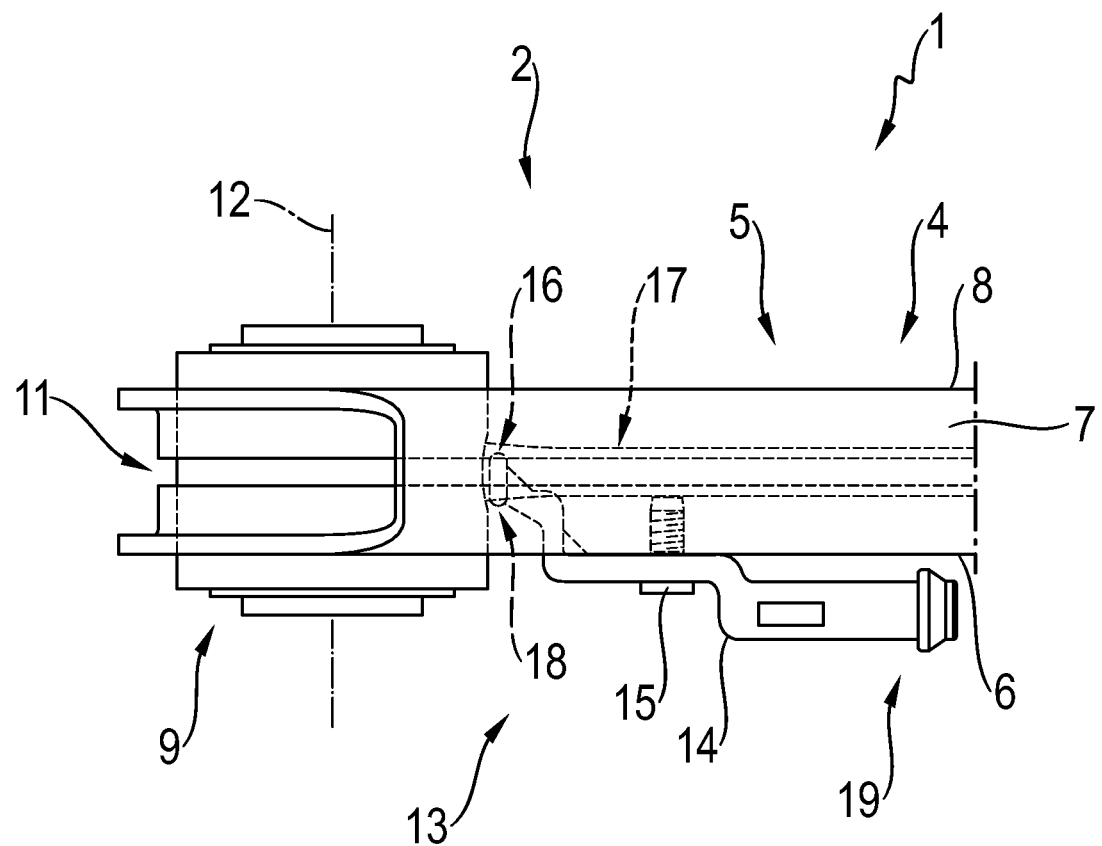
FIG. 2: A partially transparent section of a further side view of the chassis component according to the invention shown in FIG. 1, FIG. 3: A perspective view of a sensor housing and a bearing as constituents of the chassis component according to the invention shown in FIGS. 1 and 2, FIG. 4: A partially transparent section of a first perspective view of a sensor housing in a first assembly position for the production of the chassis component according to the invention shown in FIGS. 1 and 2, FIG. 5: A partially transparent section of a second perspective view of a sensor housing in a second assembly position for the production of the chassis component according to the invention shown in FIGS. 1 and 2, FIG. 6: A partially transparent section of a third perspective view of a sensor housing in a third assembly position for the production of the chassis component according to the invention shown in FIGS. 1 and 2, and FIG. 7: A section of a side view of a further chassis component according to the invention.

FIG. 2 shows a partially transparent section of a further side view of the chassis component 1 according to the invention shown in FIG. 1. In this example embodiment the fixing means 15 consist of a screw. Alternatively, the fixing means can be in the form of a rivet. The sensor housing 14 has a first sensor element 16. In this example embodiment the first sensor element 16 is in the form of a magnetic-field-sensitive sensor or a Hall sensor. In this example embodiment the sensor housing 14 is an injection-molded plastic component. Moreover, in this example the first sensor element 16 is completely embedded in the material of the sensor housing 14. In other words, the first sensor element 16 is encapsulated in the material of the sensor housing 14, whereby the first sensor element 16 is protected against outside influences.

The open profile 5 forms an at least partially free inside space 17. In this case the first sensor element 16 is arranged within the inside space 17. The sensor housing 14 has a first end 18 and a second end 19 remote from the first end 18. The first sensor element 16 is located at the first end 18 of the sensor housing 14. In this example embodiment the second end 19 is in the form of a plug-in portion. The second end 19 in the form of a plug-in portion serves to be connected to a conducting lead (not shown here) which connects the sensor device 13 to an evaluation unit (not shown).

The first end 18 or first sensor element 16 faces toward the bearing 9. In this case the sensor housing 14 is fixed onto the profile 5 in such manner that the distance between the first end 18 or first sensor element 16 on the one hand and the bearing 9 on the other hand is as small as possible.

In this example embodiment the sensor housing 14 has a contour with a number of steps. Here, the sensor housing 14 has a contour with three steps. By virtue of this multi-stepped contour, a design of the sensor housing 14 which is at the same time functional and sufficiently flat can be produced.

Figure 3:
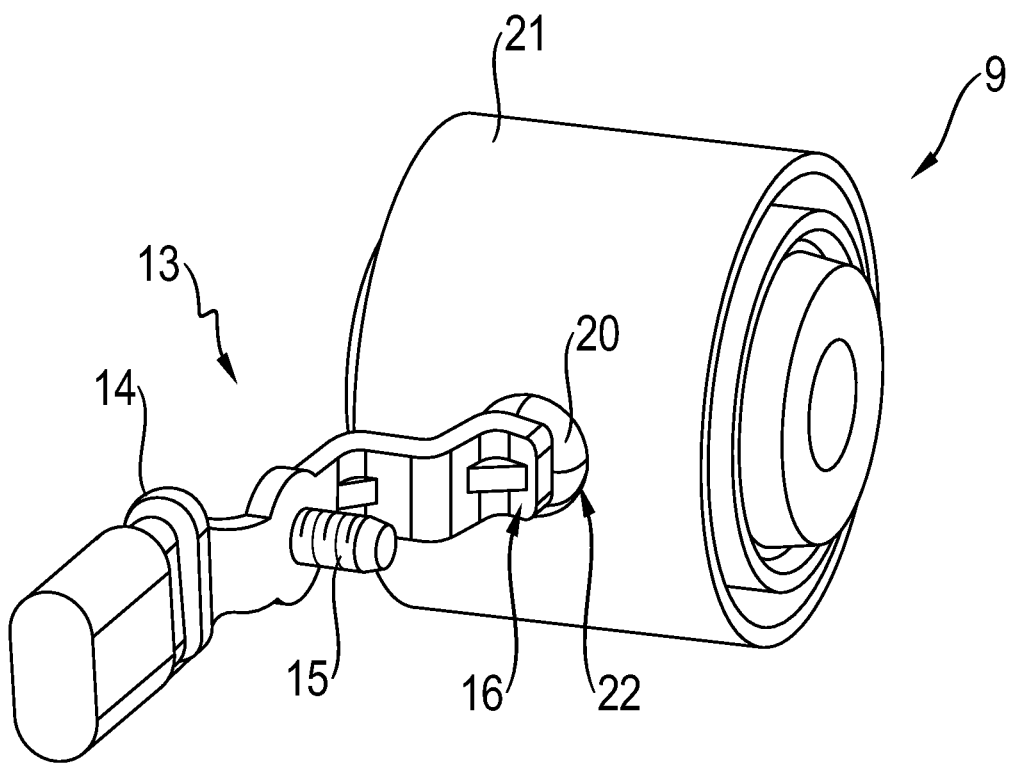

FIG. 3 shows a perspective view of the sensor housing 14 and the bearing 9 as parts of the chassis component 1 according to FIGS. 1 and 2. In this case, for the sake of better clarity the open profile 5 is omitted. The bearing 9 contains a second sensor element 20. The second sensor element 20 is part of the sensor device 13. The second sensor element 20 in this example embodiment is a magnet or permanent magnet inside the rubber material of the bearing 9. Here, the second sensor element 20 can be regarded as a signal emitter and the first sensor element 16 as a signal receiver. Correspondingly, the first sensor element 16 and the second sensor element 20 co-operate together.

The bearing 9 has an outer sleeve 21. The outer sleeve 21 has an opening 22. In this case the opening 22 is in the form of a cut-out in the wall material of the outer sleeve 21. In addition, the bearing 9 is arranged or orientated in such manner that the opening 22 faces toward the first sensor element 16. Thus, the first sensor element 16 is positioned outside the outer sleeve 21 and close to the opening 22. The first sensor element 16 and the second sensor element 20 are arranged and orientated with the smallest possible distance from one to the other. In this case the first sensor element 16 and the second sensor element 20 are in functional connection with one another through the opening 22.

Figure 4:
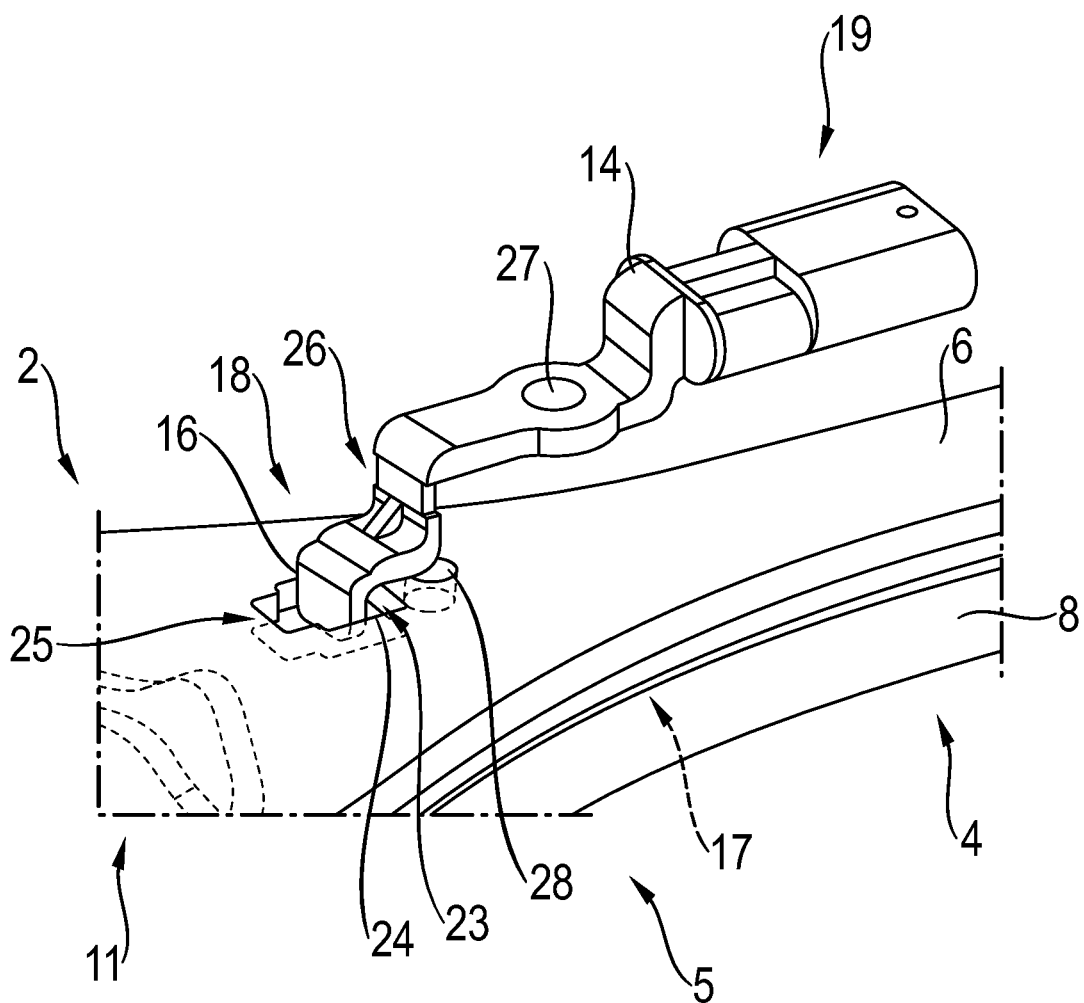

FIG. 4 shows a partially transparent section of a first perspective view of the sensor housing 14 in a first assembly position for producing the chassis component 1 according to the invention as shown in FIGS. 1 and 2. The wall 6 of the open profile 5 has a through-going opening 23. The through-going opening 23 is positioned close to the bearing holder 11 of the first end section 2. The inside space 17 formed by the walls 6, 7 and 8 of the profile 5 is accessible through the through-going opening 23. The through-going opening 23 has a rim 24 which, in this example embodiment, has an essentially right-angle-shaped design. The diameter of the through-going opening 23 is such that the sensor housing 14 can be inserted at least with its first end 18 and the first sensor element 16 first through the through-going opening 23 into the inside space 17.

The rim 24 of the through-going opening 23 has a first plug-in portion 25. The sensor housing 14 has a second plug-in portion 26. As is explained in greater detail with reference to the next figure, the first plug-in portion 25 and the second plug-in portion 26 are shaped to match one another so as to form an interlock.

The sensor housing 14 has a perforation 27. In this example embodiment the perforation 27 is positioned approximately half-way between the two ends 18 and 19. In addition the profile 5 or the wall 6 has a fixing opening 28. Both the perforation 27 and the fixing opening 28 serve, according to FIGS. 1 to 3, to allow passage of the fixing means 15 and thus to enable the sensor housing 14 to be fixed onto the profile 5 as in FIGS. 1 and 2.

Figure 5:
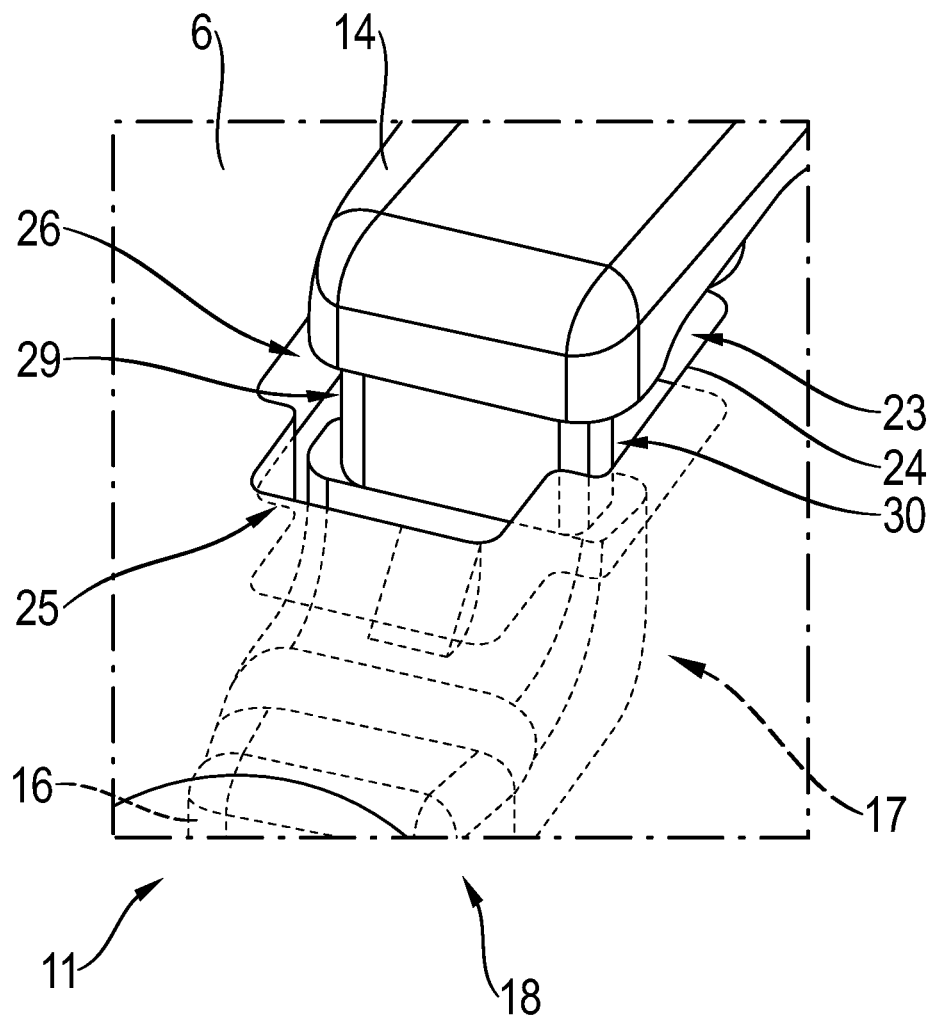

FIG. 5 shows a partially transparent section of a second perspective view of the sensor housing 14 in a second assembly position for producing the chassis component 1 shown in FIGS. 1 and 2. In the assembly position shown in this case, the sensor housing 14 has been inserted through the through-going opening 23 into the inside space 17 until the second plug-in portion 26 of the sensor housing 14 is positioned inside the opening 23. In other words, in this assembly position the rim 24 surrounds the second plug-in portion 26 of the sensor housing 14. In this example embodiment the second plug-in portion 26 is in the form of a kind of constriction of the sensor housing 14. In detail, to form the second plug-in portion 26 the sensor housing 14 has two grooves 29 and 30. The grooves 29, 30 are formed on sides of the sensor housing 14 that face away from one another. In that way, the second plug-in portion 26 in the form of a constriction is produced by virtue of a partial diameter reduction of the sensor housing 14.

The first plug-in portion 25 in this example embodiment is in the form of a groove-like depression in the rim 24 of the through-going opening 23. Furthermore, in this example embodiment the first plug-in portion 25 or the groove-like depression is formed in a section of the rim 24 that faces toward the bearing holder 11.

To produce an interlocked connection between the first plug-in portion 25 and the second plug-in portion 26, the sensor housing 14 is pushed, starting from the assembly position illustrated here, in the direction toward the bearing holder 11. In that way, the second plug-in portion 26 of the sensor housing 14 is pressed with interlock into the first plug-in portion 25 of the rim 24. By virtue of this interlock the sensor housing 14 is already held on the profile 5 in relation to two spatial directions.

Figure 6:
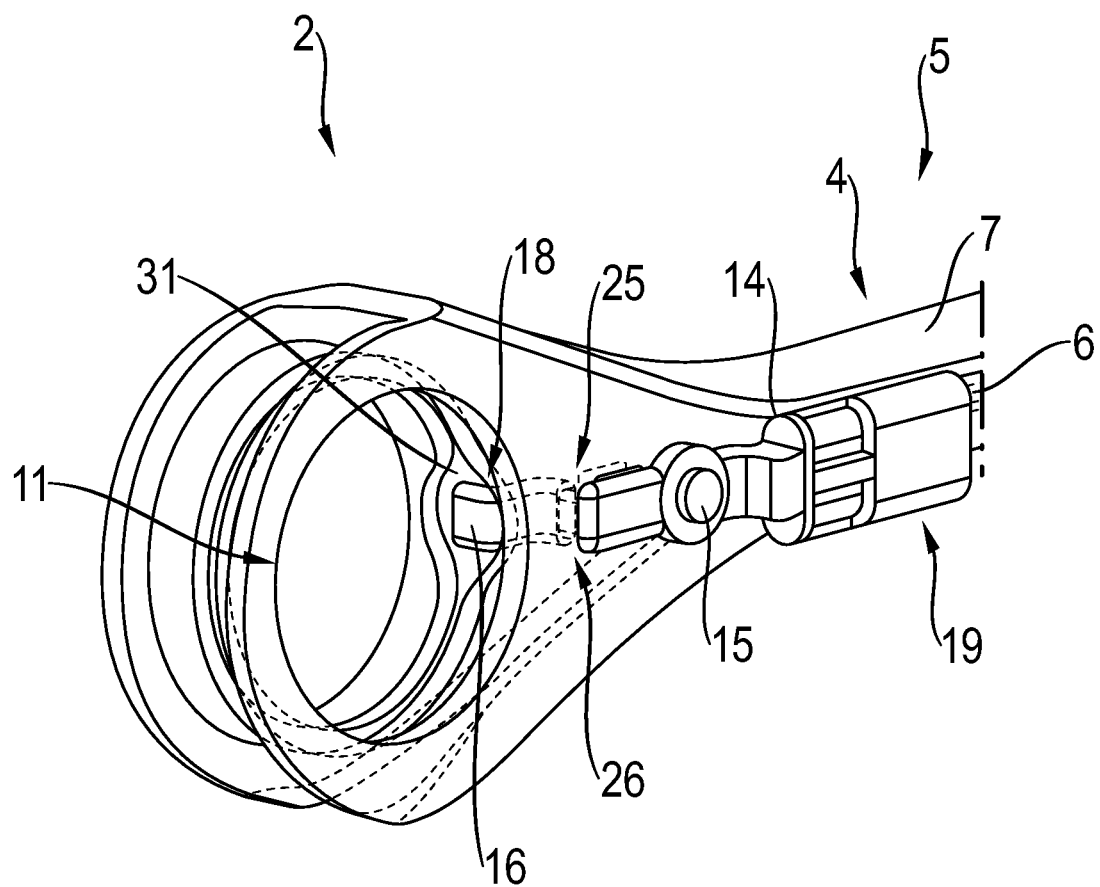

FIG. 6 shows a partially transparent section of a third perspective view of the sensor housing 14 in a third assembly position for producing the chassis component 1 shown in FIGS. 1 and 2. In this case, after the second plug-in portion 26 has been inserted into the first plug-in portion 25, as described with reference to the previous FIG. 5, the sensor housing 14 is finally fixed or secured onto the profile 5 by the fixing means 15. By virtue of the fixing means 15 the sensor housing 14 is thereby secured on the profile 5 at least in relation to a third spatial direction. In particular, the three spatial directions mentioned above define a three-dimensional Cartesian space.

In this case the bearing holder 11 is shown without the bearing 9 in the end section 2 according to FIGS. 1 and 2. This makes it possible to see that the first end 18 of the sensor housing 14 or the first sensor element 16 is located within a free space 31 in the bearing holder 11. This enables the first sensor element 16 to be positioned as small a distance as possible away from the bearing 9 or the second sensor element 20 of the bearing 9 as in FIG. 1, 2, or 3.

Whereas in FIGS. 4, 5, and 6 the mounting of the sensor housing 14 onto the profile 5 is shown without the bearing 9 fitted into the bearing holder 11, such mounting can also take place when the bearing 9 has already been fitted into the bearing holder 11.

Figure 7:
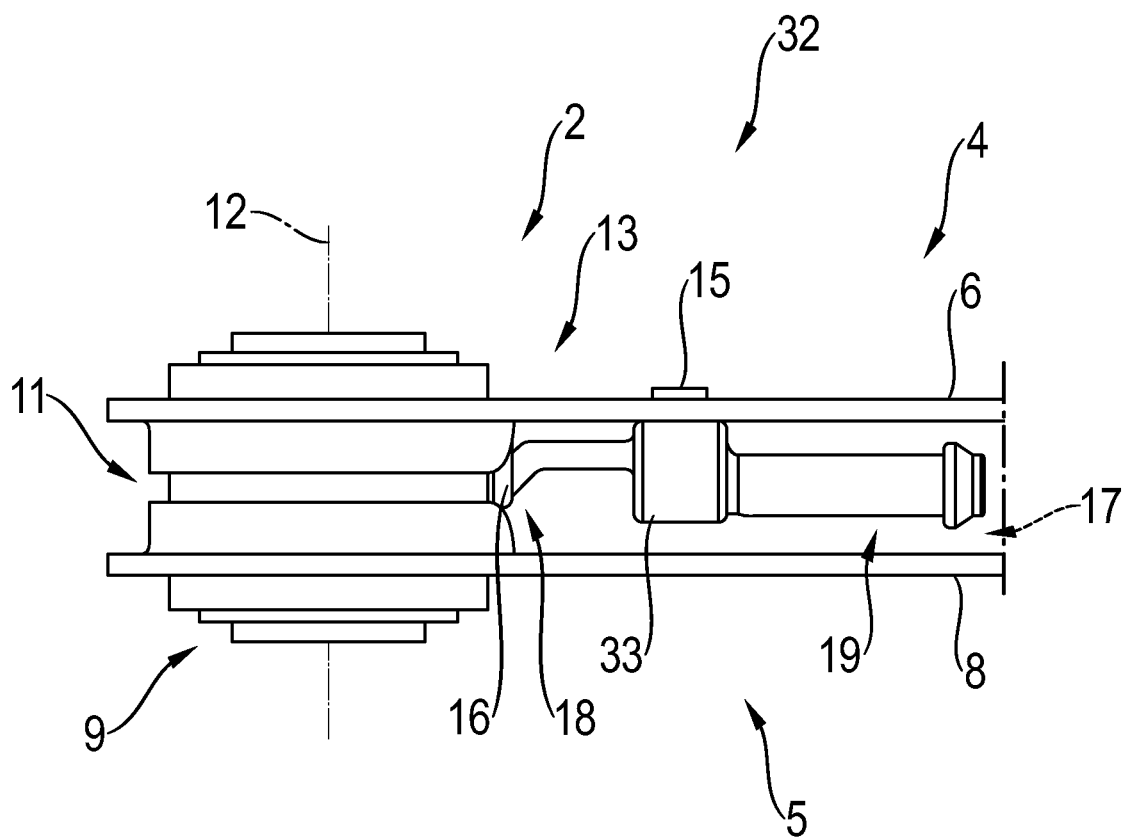

FIG. 7 shows a section of a side view of a further chassis component 32 according to the invention. The same features as before are given the same indexes. To that extent, reference can also be made to the previous description. Instead of the sensor housing 14 according to FIGS. 1 to 6, in this case a sensor housing 33 is used. The sensor housing 33 is located completely within the inside space 17. Like the sensor housing 14, the sensor housing 33 also has a first end 18 with a first sensor element 16. Otherwise than in the case of the sensor housing 14, however, the sensor housing 33 this time does not have a plurality of steps. Instead, compared with the sensor housing 14 the sensor housing 33 is of flatter shape. The sensor housing 33 is fixed to the wall 6 of the profile 5 by the fixing means 15.

INDEXES

1 Chassis component
2 First end section
3 Second end section
4 Connecting section
5 Profile
6 wall
7 wall
8 wall
9 Bearing
10 Bearing
11 Bearing holder
12 Rotation axis
13 Sensor device
14 Sensor housing
15 Fixing means
16 First sensor element
17 Inside space
18 First end
19 Second end
20 Second sensor element
21 Outer sleeve
22 Opening
23 Through-going opening
24 Rim
25 First plug-in portion
26 Second plug-in portion
27 Perforation
28 Fixing opening
29 Groove
30 Groove
31 Free space
32 Chassis component
33 Sensor housing.

The invention claimed is:

1. A chassis component comprising:
a first end section;
a second end section;
a connecting section arranged between the first end section and the second end section;
at least one bearing in one of the first end section or the second end section; and
a sensor device with a sensor housing, wherein the sensor housing comprises a first sensor element of the sensor device;
wherein the first end section, the second end section, and the connecting section are in the form of a one-piece open profile which is open on one side over a length of the open profile, wherein the open profile defines an at least partially free inside space and the first sensor element is located within the inside space.

2. The chassis component according to claim 1, wherein the sensor housing is fixed onto a wall of the open profile.

3. The chassis component according to claim 1, wherein the sensor housing is arranged at least partially or completely within the inside space, and wherein the sensor housing is in contact with an outside and/or an inside of a wall of the open profile.

4. The chassis component according to claim 1, wherein a wall of the open profile has a through-going opening and the sensor housing is inserted from outside the wall through the through-going opening into the inside space, and wherein a section of the sensor housing containing the first sensor element is positioned within the inside space.

5. The chassis component according to claim 4, wherein the through-going opening defines a rim;
wherein the rim has a first plug-in portion and the sensor housing has a second plug-in portion configured to correspond with the first plug-in portion, such that the first plug-in portion co-operates in an interlocking manner with the second plug-in portion of the sensor housing;

wherein the first plug-in portion is in the form of a groove-like depression in the rim of the through-going opening; and wherein a constriction of the sensor housing is configured to correspond with the groove-like depression and defines the second plug-in portion, the constriction configured to be plugged into the groove-like depression, and the constriction formed by a partial diameter reduction of the sensor housing.

6. The chassis component according to claim 1, wherein the sensor housing has an at least one-step, two-step or three-step contour, and the first sensor element is arranged at a first end of the sensor housing and/or a plug-in portion is arranged at a second end of the sensor housing.

7. The chassis component according to claim 1, wherein the at least one bearing comprises a second sensor element of the sensor device and the first sensor element co-operates with the second sensor element.

8. The chassis component according to claim 1, wherein the at least one bearing is in the form of a rubber bearing.

9. The chassis component according to claim 8, wherein the open profile is configured as a sheet-metal control arm.

10. The chassis component according to claim 8, wherein the rubber bearing has an outer sleeve with an opening, wherein the first sensor element is arranged outside the outer sleeve close to the said opening, and wherein a second sensor element is arranged within the outer sleeve close to the opening.

11. The chassis component according to claim 1, wherein the open profile is configured as a sheet-metal control arm.

12. The chassis component according to claim 7, wherein the first sensor element comprises a magnetic-field-sensitive sensor and the second sensor element comprises a magnet.

13. A method of producing a chassis component, comprising:

defining a first end sectio, a second end section, and a connecting section between the first end section and the second end section, wherein the first end section, the second end section, and the connecting section are in the form of a one-piece open profile which is open on one side over a length of the open profile;

defining an inside space in the open profile;

providing at least one bearing in one of the first end section or the second end section;

providing a sensor device with a sensor housing, the sensor housing comprising a first sensor element; and locating the first sensor element within the inside space.

14. The method according to claim 13, further comprising:

inserting the sensor housing through a through-going opening in a wall of the open profile so that a section of the sensor housing containing the first sensor element is positioned within the inside space; and plugging a second plug-in portion of the sensor housing into a first plug-in portion in a rim of the through-going opening, thereby producing an interlock.

15. The method according to claim 14, further comprising fixing the sensor housing onto the wall of the open profile.

* * * * *

UNITED STATES PATENT AND TRADEMARK OFFICE
CERTIFICATE OF CORRECTION

PATENT NO. : 11,999,213 B2
APPLICATION NO. : 17/998865
DATED : June 4, 2024
INVENTOR(S) : Artur Berger et al.

It is certified that error appears in the above-identified patent and that said Letters Patent is hereby corrected as shown below:

In the Claims

In Column 10, Line 8, delete "sectio" and insert --section--

Signed and Sealed this
Twentieth Day of August, 2024

Katherine Kelly Vidal
*Director of the United States Patent and Trademark Office*